(12) United States Patent
Le et al.

(10) Patent No.: US 10,963,779 B2
(45) Date of Patent: Mar. 30, 2021

(54) NEURAL NETWORK PROGRAMMER

(71) Applicant: Google LLC, Mountain View, CA (US)

(72) Inventors: Quoc V. Le, Mountain View, CA (US);
Ilya Sutskever, San Francisco, CA (US); Arvind Neelakantan, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 624 days.

(21) Appl. No.: 15/349,955

(22) Filed: Nov. 11, 2016

(65) Prior Publication Data

US 2017/0140265 A1 May 18, 2017

Related U.S. Application Data

(60) Provisional application No. 62/254,698, filed on Nov. 12, 2015.

(51) Int. Cl.
*G06N 3/04* (2006.01)
*G06N 3/08* (2006.01)

(52) U.S. Cl.
CPC .............. *G06N 3/0445* (2013.01); *G06N 3/08* (2013.01)

(58) Field of Classification Search
CPC ................................ G06N 3/0445; G06N 3/08
See application file for complete search history.

(56) References Cited

U.S. PATENT DOCUMENTS 5,167,006 A * 11/1992 Furuta .................... G06N 3/063
706/41
9,037,464 B1 5/2015 Mikolov et al.
2003/0088412 A1* 5/2003 Shetty .................... G10L 15/14
704/243
2004/0054666 A1* 3/2004 Lapir ................ G06F 16/90335
2007/0009151 A1* 1/2007 Pittman .............. G06K 9/00429
382/159
2009/0132449 A1* 5/2009 Nagashima ............ G06N 3/082
706/18
(Continued)

OTHER PUBLICATIONS

Peng et al., Towards Neural Network-based Reasoning, Aug. 22, 2015, 13 pages (Year: 2015).*
(Continued)

*Primary Examiner* — Alexey Shmatov
*Assistant Examiner* — Tri T Nguyen
(74) *Attorney, Agent, or Firm* — Fish & Richardson P.C.

(57) ABSTRACT

Methods, systems, and apparatus, including computer programs encoded on a computer storage medium, for performing operations using data from a data source. In one aspect, a method includes a neural network system including a controller neural network configured to: receive a controller input for a time step and process the controller input and a representation of a system input to generate: an operation score distribution that assigns a respective operation score to an operation and a data score distribution that assigns a respective data score in the data source. The neural network system can also include an operation subsystem configured to: perform operations to generate operation outputs, wherein at least one of the operations is performed on data in the data source, and combine the operation outputs in accordance with the operation score distribution and the data score distribution to generate a time step output for the time step.

15 Claims, 4 Drawing Sheets

(56) References Cited

U.S. PATENT DOCUMENTS

| | | | |
|---|---|---|---|
| 2013/0006610 A1* | 1/2013 | Quadracci | G06F 17/218 704/9 |
| 2016/0358069 A1* | 12/2016 | Brothers | G06F 7/764 |
| 2017/0024645 A1* | 1/2017 | Socher | G06F 16/3329 |
| 2018/0247180 A1* | 8/2018 | Cheng | G06K 9/4628 |

OTHER PUBLICATIONS

Weston et al., Memory Networks, Nov. 29, 2015, 15 pages (Year: 2015).*

Grefenstette et al., Learning to Transduce with Unbounded Memory, Nov. 3, 2015, 14 pages (Year: 2015).*

Graves et al., Neural Turing Machines, Dec. 10, 2014, 26 pages (Year: 2014).*

Mao et al, Deep Captioning With Multimodal Recurrent Neural Networks (M-RNN), Jun. 11, 2015, 17 pages.*

International Search Report and Written Opinion in International Application No. PCT/US2016/061657, dated Feb. 8, 2017, 16 pages.

Grefenstette et al. "Learning to Transduce with Unbounded Memory," Advances in Neural Information Processing Systems, Nov. 3, 2015, 9 pages.

Joulin et al. "Inferring Algorithmic Patterns with Stack-Augmented Recurrent Nets," Advances in Neural Information Processing Systems, 2015, 9 pages.

Zaremba et al. "Learning to Execute," arXiv preprint arXiv: 1410.4615v3, Feb. 19, 2015, 25 pages.

Cho et al. "Learning Phrase Representations using RNN Encoder-Decoder for Statistical Machines Translation," arXiv preprint arXiv 1406.1078v3, Sep. 3, 2014, 15 pages.

International Preliminary Report on Patentability issued in International Application No. PCT/US2016/061657, dated May 24, 2018, 10 pages.

Bahdanau et al., "End-to-end attention-based large vocabulary speech recognition," ar Xiv preprint arxiv:/508.04395, 2015, 8 pages.

Bahdanau et al., "Neural machine translation by jointly learning to align and translate," arXiv preprint arXiv:1409.0473, 2014, 15 pages.

Bordes et al., "Question answering with subgraph embeddings," In EMNLP, 2014, 10 pages.

Cantlon et al., "Functional imaging of numerical processing in adults and 4-y-old children," PLoS Biology, May 2006, 4(5)e125:844-854.

Chan et al., "Listen, attend and spell," arXiv preprint arXiv:1508.01211, 2015, 16 pages.

Clarke et al., "Driving semantic parsing from the world's response," In CoNLL, 2010, pp. 18-27.

Das et al., "Learning context-free grammars. Capabilities and limitations of a recurrent neural network with an external stack memory," In CogSci, 1992a, 6 pages.

Das et al., "Using prior knowledge in an NNPDA to learn context-free languages," In NIPS, 1992b, 8 pages.

Dastjerdi et al., "Numerical processing in the human parietal cortex during experimental and natural conditions," Nature communications, Oct. 2013, 4:2528, pp. 1-11.

Eisenstein et al., "Reading to learn: Constructing features from semantic abstracts," In EMNLP, 2009, 10 pages.

Elman, Jeffrey L., "Finding structure in time," Cognitive Science, 1990, 14:179-211.

Fias et al., "Processing of abstract ordinal knowledge in the horizontal segment of the intraparietal sulcus," The Journal of Neuroscience, Aug. 2007, 27(33):8952-8956.

Gers and Schmidhuber, "LSTM recurrent networks learn simple context free and context sensitive languages," IEEE Transactions on Neural Networks, 2001, 14 pages.

Graves and Jaitly, "Towards end-to-end speech recognition with recurrent neural networks," In ICML, 2014, 9 pages.

Graves et al., "Neural turing machines," arXiv preprint arXiv:1410.5401, 2014, 26 pages.

Graves, Alex, "Generating sequences with recurrent neural networks," arXiv preprint arxiv:1308.0850, 2013, 43 pages.

Hannun et al., "Deep Speech: Scaling up end-to-end speech recognition," arXiv preprint arxiv:1412.5567, 2014, 12 pages.

Hermann et al., "Teaching machines to read and comprehend," NIPS, 2015, 14 pages.

Hinton et al., "Deep neural networks for acoustic modeling in speech recognition," Signal Processing Magazine, Nov. 2012, 16 pages.

Hochreiter et al., "Long short-term memory," Neural computation, 1997, 9(8):1735-1780.

Huber, Peter. "Robust estimation of a location parameter," In the Annals of Mathematical Statistics, Nov. 1964, 35:73-101.

Iyyer et al., "A neural network for factoid question answering over paragraphs," In EMNLP, 2014, 13 pages.

Joulin and Mikolov, "Inferring algorithmic patterns with stack-augmented recurrent nets," arXiv preprint arXiv:1503.01007, 2015, 10 pages.

Kingma and Ba, "Adam: A method for stochastic optimization," arXiv preprint arXiv:1412.6980, 2014, 13 pages.

Krizhevsky et al., "Imagenet classification with deep convolutional neural networks," In NIPS, 2012, 9 pages.

Kucian et al., "Impaired neural networks for approximate calculation in dyscalculic children: a functional rnri study," Behavioral and Brain Functions, 2006, 2:31, 17 pages.

Liang et al., "Learning dependency-based compositional semantics," In ACL, 2011, 10 pages.

Liang et al., "Learning programs: A hierarchical Bayesian approach," In ICML, 2010, 8 pages.

Lin et al., "Modeling relation paths for representation learning of knowledge bases," In EMNLP, 2015, 10 pages.

Luong et al., "Addressing the rare word problem in neural machine translation," ACL, 2014, 9 pages.

Neelakantan et al., "Compositional vector space models for knowledge base completion," In ACL, 2015, 11 pages.

Neelakantan et al., "Neural programmer: Inducing latent programs with gradient descent," arXiv preprint arXiv:1511.04834, 2015, 15 pages.

Pasupat et al., "Compositional semantic parsing on semi-structured tables," In ACL, 2015, 11 pages.

Peng et al., "Towards neural network-based reasoning," arXiv preprint arxiv:/508.05508, 2015, 4 pages.

Piantadosi et al., "A Bayesian model of the acquisition of compositional semantics," In CogSci, 2008, 6 pages.

Piazza et al., "Tuning curves for approximate numerosity in the human intraparietal sulcus," Neuron, Oct. 2004, 44:547-555.

Poon, Hoifung, "Grounded unsupervised semantic parsing," In ACL, 2013, 11 pages.

Schmidhuber, J., "A self-referential weight matrix," In !CANN, 1993, 5 pages.

Shang et al., "Neural responding machine for short-text conversation," arXiv preprint arXiv:1503.02364, 2015, 12 pages.

Steijvers et al., "A recurrent network that performs a context-sensitive prediction task," In CogSci, 1996, 5 pages.

Sukhbaatar et al., "End-to-end memory networks," arXiv preprint arXiv:1503.08895, 2015, 9 pages.

Sutskever et al., "Sequence to sequence learning with neural networks," In NIPS, 2014, 9 pages.

Vinyals et al., "A neural conversational model," ICML DL Workshop, 2015, 7 pages.

Vinyals et al., "Show and tell: A neural image caption generator," In CVPR, 2015.

Von Neumann, John, "First draft of a report on the EDVAC," Technical report, Jun. 1945, 49 pages.

Wang et al., "Building a semantic parser overnight," In ACL, 2015, 11 pages.

Welling and The, "Bayesian learning via stochastic gradient Langevin dynamics," In ICML, 2011, 8 pages.

Weston et al., "Memory Networks," arXiv preprint arXiv:1410.3916, 2014, 15 pages.

(56) References Cited

OTHER PUBLICATIONS

Xu et al., "Show, attend and tell: Neural image caption generation with visual attention," In ICML, 2015, 10 pages.
Zelle et al., "Learning to parse database queries using inductive logic Programming," In AAAI/IAAI, 1996, 6 pages.
Zeng et al., "Discrete recurrent neural networks for grammatical inference," IEEE Transactions on Neural Networks, Mar. 1994, 5(2):320-330.
Zettlemoyer et al., "Learning to map sentences to logical form: Structured classification with probabilistic categorial grammars," In UAI, 2005, 9 pages.
EP Office Action in European Application No. 16801673.1, dated Aug. 1, 2019, 7 pages.
Andreas, et al., "Learning to compose neural networks for question answering," ArXiv, Jan. 2016, 1601.01705, 10 pages.
Kumar et al., "Ask me anything: Dynamic memory networks for natural language processing," ArXiv, Sep. 2015, 1378-87.
Neelakantan et al., "Adding gradient noise improves learning for very deep networks," ICLR Workshop, 2016, 11 pages.
Reed and Freitas, "Neural programmer-interpreters," ICLR, Feb. 2016, 10 pages.
Sutskever et al., "Sequence to sequence learning with neural networks," NIPS, Dec. 2014, 9 pages.
Werbos, "Backpropagation through time: what does it do and how to do it," Proceedings of IEEE, Oct. 1990, 78(10):1550-60.
Yin et al., "Neural enquirer: Learning to query tables with natural language," ArXiv, Jan. 2016, 1512.009651, 19 pages.
EP Summons to attend oral proceeding in European Application No. 16801673.1, dated Jul. 3, 2020, 9 pages.

\* cited by examiner

NEURAL NETWORK PROGRAMMER

CROSS REFERENCE TO RELATED APPLICATIONS

This application claims the benefit of U.S. Provisional Application No. 62/254,698, filed Nov. 12, 2015, the contents of which are incorporated herein.

BACKGROUND

This specification relates to neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network can use some or all of the internal state of the network from a previous time step in computing an output at a current time step.

SUMMARY

This specification describes a system implemented as computer programs on one or more computers in one or more locations.

The system generates a system output from a system input by repeatedly performing operations from a set of operations using data from a data source.

In particular, the system includes a controller neural network configured to, for each of multiple time steps, receive a controller input for the time step and process the controller input and a representation of the system input to generate: (i) an operation score distribution that assigns a respective operation score to each operation in the set of operations, and (ii) a data score distribution that assigns a respective data score to each of multiple locations in the data source.

The system also includes an operation subsystem configured to, for each of the time steps, perform operations from the set of operations to generate a set of operation outputs, wherein at least one of the operations is performed on data in the data source, and combine the operation outputs in accordance with the operation score distribution and the data score distribution to generate a time step output for the time step.

In some implementations, the system generates the system output from the time step output for the last time step.

Advantageous implementations can include one or more of the following features. The system can include a recurrent neural network that is augmented with a set of arithmetic and logical operations to perform complex reasoning. Specifically, recurrent neural network can be implemented with multiple layers such as an operation neural network layer and a data neural network layer. The system can use the neural network layers to perform operations of a set of operations on data of a particular data segment that is located in a data source. The system can be fully differentiable. As such, the system can be trained in an end-to-end implementation to induce programs that require little to no human supervision. The system can be applied across a variety of different domains of data. For example, the system can be applied to multiple different natural languages. In this instance, the system can be provided with a natural language question as an input, and generate an answer as output that corresponds to the natural language question.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
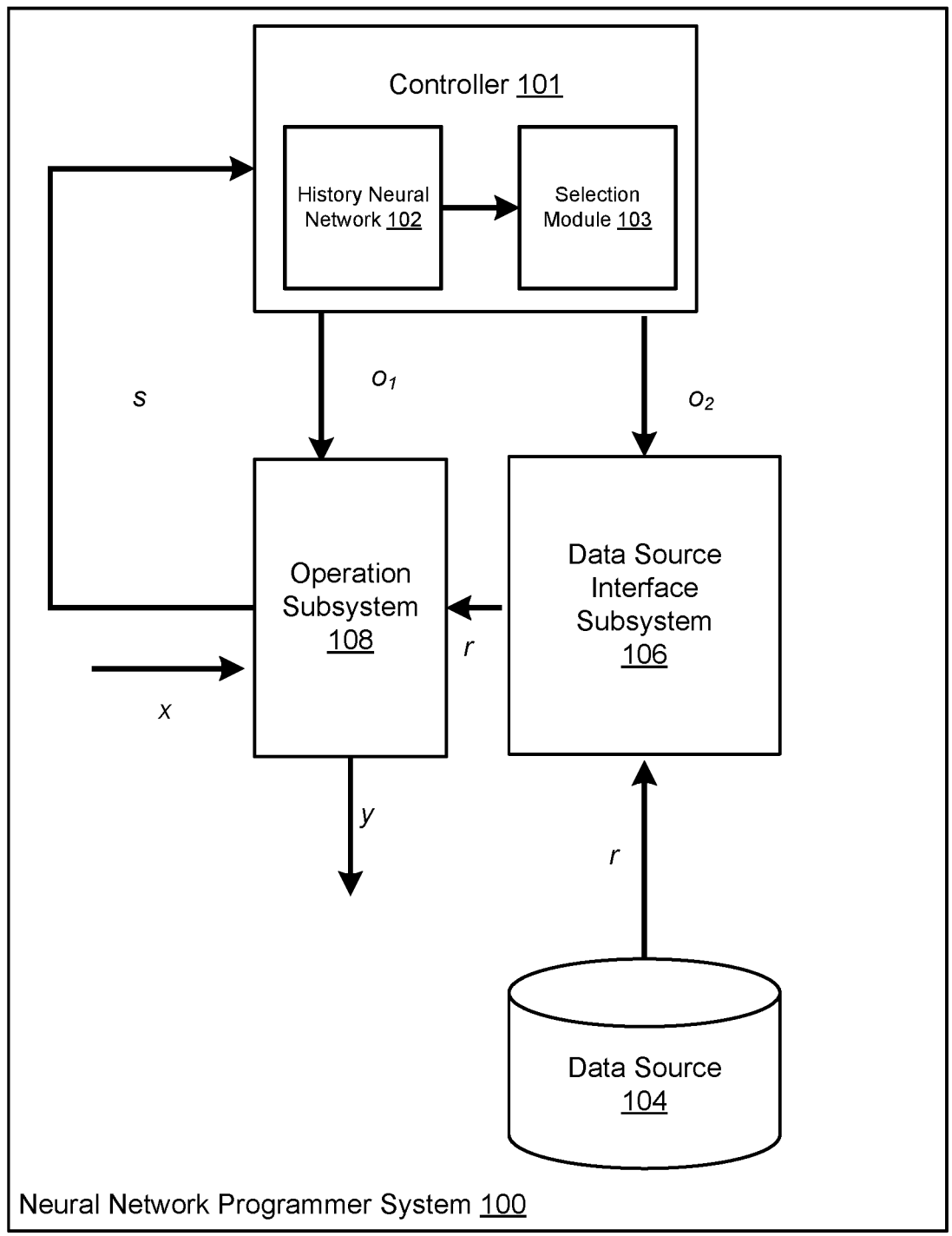
FIG. 1 shows an example neural network programmer system.

FIG. 1 shows an example neural network programmer system 100. The neural network programmer system 100 is an example of a system implemented as computer programs on one or more computers in one or more locations, in which the systems, components, and techniques described below are implemented.

The neural network programmer system 100 is a machine learning system that receives system inputs and generates system outputs from the system inputs. For example, the neural network programmer system 100 can receive a system input x and generate a system output y from the system input x. The neural network programmer system 100 can store the outputs in an output data repository, provide the outputs for use as inputs by a remote system, provide the outputs or data characterizing the outputs for presentation to a user, or any combination thereof.

The neural network programmer system 100 can be applied to a variety of different domains of data. For example, the neural network programmer system 100 can be applied to natural languages in the form of utterances or text. As such, the input to the neural network programmer system 100 can be a natural language question in the form of an utterance, text, or any combination thereof. In this instance, the system output generated by the neural network programmer system 100 can be an estimate of an answer to the natural language question. As such, the neural network programmer system 100 can be part of a question and answer system.

As another example, the neural network programmer system 100 can be part of a semantic parsing system. That is, the input to the neural network programmer system 100 can be a natural language question in the form of an utterance, text, or any combination thereof. In this instance, the system output generated by the neural network programmer system 100 can be a representation of the input question as an executable query to a database, i.e., a query that is in a particular format required by the database.

As another example, the neural network programmer system 100 can be part of a context free grammar system. That is, the input to the neural network programmer system 100 can be a natural language text segment. In this instance, the system output generated by the neural network programmer system 100 can be a representation of the text segment in a context free grammar.

Referring to FIG. 1, the neural network programmer system 100 includes a controller 101, a data source 104, a data source interface subsystem 106 and an operation subsystem 108.

Generally, the neural network programmer system 100 receives a query that relates to data stored in the data source 104 and repeatedly applies a set of modules to the data in the data source 104 to generate the system output. In particular, the manner in which the system applies the set of modules is defined by outputs generated by the controller 101.

The controller 101 is a recurrent neural network that, at each of multiple time steps, is configured to receive a neural network input and process the neural network input to generate a neural network output. The neural network input can also be referred to as a controller input and the neural network output can also be referred to as a controller output.

In certain aspects, a history recurrent neural network 102 and a selection module 103 can function as the controller 101. In this instance, the history recurrent neural network 102 can generate an updated hidden state from a neural network input. The updated hidden state can be a representation of previous operations and previous columns that have been selected by the neural network programmer system 100 at a previous time step. The updated hidden state can be provided to the selection module 103.

The selection module 103 can assign probability distributions from the updated hidden state and generate neural network outputs. As such, the history recurrent neural network 102 can operate in combination with the selection module 103 as the controller 101, to receive a neural network input and process the neural network input to generate a neural network output. During the processing of a neural network input, the selection module 103 and the history recurrent neural network 102 run for an equal number of time steps. For example, if the history recurrent neural network 102 is run for "T" steps, the selection module 103 will run for "T" steps.

In certain aspects, the neural network output o generated by the controller 101 is provided to the operation subsystem 108 as a first output $o_1$ and to the data source interface subsystem 106 as a second output $o_2$.

The data source interface subsystem 106 receives outputs $o_2$ generated by the controller 101. For example, the data source interface subsystem 106 can receive the output $o_2$, and translate the received output into erase, read, and write operations to be performed on the data source 104. That is, the data source interface subsystem 106 receives an output $o_2$ from the controller 101 and, based on the output $o_2$, erases data e from the data source 104, writes data w to the data source 104, and reads data r from the data source 104.

The data source 104 stores data vectors read by the data source interface subsystem 106. The data source 104 can include data segments in the form of rows and tables. The data segments may be accessed by the data source interface subsystem 106 in response to neural network outputs provided by the controller 101. Each of the data segments may be accessed according to a particular location in the data source 104.

The operation subsystem 108 includes built in operations which enable the neural network programmer system 100 to generate powerful compositional programs. The operation subsystem 108 can be configured to receive output $o_1$ from the controller 101. The operation subsystem 108 can also be configured to read data r from the data source interface subsystem 106. The operation subsystem 108 can be configured to access output o of the controller 101 for every time step prior to a current time step. The operations subsystem 108 can further be configured to provide system output y. For example, the operation subsystem 108 can generate an output that includes a scalar output and a lookup output for each the multiple time steps.

The scalar output can include a scalar number that is provided as output. The lookup output can include a probability that a particular answer in the data source is part of the time step output. The neural network programmer system 100 can determine whether the system output includes a scalar output or a lookup output after a predetermined number of time steps and corresponding time step outputs.

In certain aspects, the controller 101 can maintain a mask variable that is updated at every time step. The mask variable can be used as a row selector of a particular data source, such as a particular row or column of the particular data source. As such, the mask variable can be used to enable probabilistic row and column selection, or data source selection.

The neural network programmer system 100 can also include an encoding recurrent neural network. The encoding recurrent neural network can encode the system input for processing by the controller 101. For example, the encoding neural network can be used to process system inputs such as natural language questions. The encoding recurrent neural network can convert system inputs, such as questions, to a distributed representation within the neural network programmer system 100. For example, given an input question containing Q number of words $\{w_1, w_2, \ldots, w_Q\}$, the encoding recurrent neural network can be configured to perform the following computations, $$z_i = \tan h(W^{question}[z_{i-1}; V(w_i)]), \forall i=1,2,\ldots,Q$$

In this instance, $V(w_i)$ represents an embedded representation of the word $w_i$, [a, b] represents the concatenation of two vectors a and b, $W^{question}$ represents a recurrent matrix of the controller 101, tan h is the element-wise non-linearity function, $z_i$ represents the hidden state of the encoding neural network for the i-th word in the question, and the hidden state for the last word in the question $z_Q$ is used as the representation of the question.

The question that is input at the neural network programmer system 100 can be pre-processed by the controller 101 by removing numbers that occur in the questions and storing the numbers of each question in a separate list. Each number that is stored in the separate list can be stored with the word that immediately precedes the number in the system input. The storage of the words with the numbers can be used to compute pivot values for the comparison of operations to be performed on the output of the controller 101.

In some aspects, the controller 101 can be a bidirectional recurrent neural network. The bidirectional recurrent neural network can be used to process relatively long questions that are provided as system inputs after being processed by the encoding recurrent neural network.

The controller 101 can be configured to produce probability distributions at each time step. In certain aspects, the controller 101 can be configured to produce a first probability distribution over a set of operations of the operation subsystem 108 and a second probability distribution of a set of columns corresponding to multiple data segments stored in the data source 104. The controller 101 can also be configured to use the question representation provided by the encoding recurrent neural network as well as hidden states generated previously by the controller 101, at a current time step. The hidden states can correspond to previous operations and previous columns that have been selected by the controller 101 at a previous time step.

In certain aspects, the history recurrent neural network 102 and the selection module 103 can function to generate the probability distributions. The history recurrent neural network 102 can be configured to use the question representation provided by the encoding recurrent neural network to generate an updated hidden state for a current time step. The updated hidden state can be provided to the selection module 103 by the history recurrent neural network 102. The selection module 103 can process the updated hidden state for the current time step using multiple neural network layers. For example, the selection module 103 can process the updated hidden state using operations neural network layers and data neural network layers.

The operations neural network layers can include one or more neural network layers that generate a first probability distribution over a set of operations, otherwise referred to as operation score distribution. The first probability distribution over the set of operations can be performed by the following computations, $$\alpha_t^{op} = \text{softmax}(U \tan h(W^{op}[q;h_t]))$$

In this instance, $W^{op}$ represents a parameter matrix of the operation selection component of the controller 101, U represents a matrix storing the representations of the operations, and $\alpha_t^{op}$ represents the first probability distribution over the set of operations of the operation subsystem 108.

The data neural network layers can include one or more neural network layers that generate a second probability distribution over a set of data, otherwise referred to as data score distribution. The second probability distribution over the set of columns can be used to obtain vector representations for names of the columns using the parameters in the encoding recurrent neural network. The second probability distribution can be computed using word embedding or a recursive neural network phrase embedding. For example, given P as the matrix storing the representations of the column names, the second probability distribution, or otherwise referred to as data selection, can be performed by the following computations, $$\alpha_t^{col} = \text{softmax}(P \tan h(w^{col}[q;h_t]))$$

In this instance, $W^{col}$ represents the parameter matrix of the data selection component of the controller 101, and $\alpha_t^{col}$ represents the second probability distribution over the set of columns stored in the data source 104.

The controller 101 can also be configured to track operations and data segments, such as columns, that were previously selected by the controller 101. This historical data can be encoded in a hidden vector for each time step. In certain aspects, the hidden vector corresponds to a hidden state of the controller 101. The data of the hidden states can be used by the controller 101 to induce the probability distributions over the operations and the data segments at subsequent time steps.

For example, given a time step t, the controller 101 can obtain a neural network input. The neural input can be based on the neural network output that was produced by the system for a previous time step. For example, the neural network input can be generated by concatenating the weighted representations of the operations and the values of the columns with their corresponding probability distribution produced for the previous time step. In this instance, the probability distributions of the operations and the column names are generated by the controller 101 at time step t−1. More precisely, the neural network input can be obtained by the following computations, $$c_t = [(\alpha_{t-1}^{op})^T U; (\alpha_{t-1}^{col})^T P]$$

In this instance, U represents the matrix storing the representations of the operations.

Further, the controller 101 can generate an updated hidden state corresponding to the current hidden state by the following computations, $$h_i = \tan h(W^{history}[c_t; h_{t-1}]), \forall i = 1, 2, \ldots, Q$$

In this instance, $W^{history}$ represents the recurrent matrix of the controller 101, and $h_t$ represents the current representation of the updated hidden state.

In certain aspects, the operation subsystem 108 can include a plurality of operations that are built into the operation subsystem 108. The operations can include any of the following: sum, count, difference, greater, lesser, and, or, print, reset, and the like. Each of the operations can correspond to a particular type of operation. For example, the operations of sum and count can correspond to an aggregate type of operation. In another example, the operation of difference can correspond to an arithmetic type of operation. In another example, the operations of greater and lesser can correspond to a comparison type of operation. In a further example, the operations of and or can correspond to a logical type of operation. The operation of print can correspond to a print type of operation and the reset operation can correspond to a reset type of operation.

In some aspects, the comparison type of operation, including the operations of greater and lesser, require a pivot value as input. The pivot value can be determined by the controller 101 and be based on a particular question. The pivot value can be computed for a particular operation by adding up all the numbers that occur in the corresponding question and weighting each of the numbers with a particular probability. In this instance, the probability of each number may be assigned to each number based on a hidden vector at a position to the left of each number, as well as on an embedding vector that corresponds to the particular operation being used. For example, the pivot value can be generated by the following computations, $$\beta_{op} = \text{softmax}(ZU(op))$$

$$\text{pivot}_{op} = \sum_{i=1}^{N} \beta_{op}(i) q n_i$$

In this instance, U(op) represents a vector representation of the operation "op" and Z is a matrix storing hidden vectors of the encoding recurrent neural network at positions to the left of the occurrence of the numbers.

The operation subsystem 108 can be configured to perform operations of a particular type at a particular time step, using a data segment that is read from data source 104 by the data source interface subsystem 106, such as a table, and a mask variable that functions as a row selector. For example, the operation subsystem 108 can be configured to generate a system output and corresponding mask variable at a particular time step by combining the operation output of each individual operation on certain data segments that are weighted with their corresponding, assigned probabilities. For example, the system outputs can be generated by the following computations, $$\text{scalar\_output}_t =$$
$$\alpha_t^{op}(\text{count})\text{count}_t + \alpha_t^{op}(\text{difference})(\text{diff})_t + \sum_{j=1}^{C} \alpha_t^{col}(j)\alpha_t^{op}(\text{sum})\text{sum}_t[j]$$

$$\text{lookup\_output}_t[i][j] = \alpha_t^{col}(j)\alpha_t^{op}(\text{print})\text{print}_t[i][j],$$
$$\forall (i, j) i = 1, 2, \ldots, M,$$
$$j = 1, 2, \ldots, C$$

In this instance, scalar_output$_t$ represents the scalar output and lookup_output$_t$[i][j] represents the lookup output. The scalar output can include a scalar number that is provided as output. The lookup output can include a probability that a particular answer in the data source is part of the time step output. In certain aspects, the scalar output or the lookup output can represent the system output.

In some aspects, outputs from previous time steps can be used as inputs by operation subsystem 108. As such, the controller 101 can track the use of previous operations as well as the previously selected data segments. The previous operations and data segments can be used to induce updated probability distributions over the operations and the data segments.

Further, the mask variable can be generated by the following computations, $$\text{mask}_t[i] = \alpha_t^{op}(\text{and})\text{and}_t[i] + \alpha_t^{op}(\text{or})\text{or}_t[i] + \alpha_t^{op}(\text{reset})\text{reset}_t[i] +$$
$$\sum_{j=1}^{C} \alpha_t^{col}(j)(\alpha_t^{op}(\text{greater})g_t[i][j] + \alpha_t^{op}(\text{lesser})l_t[i][j]),$$
$$\forall_i = 1, \ldots, M$$

The mask variable includes a value that may be updated at every time step. The value of the mask variable can be used as a row selector of a particular data source, such as a particular row or column of the particular data source. As such, the mask variable can be used to enable probabilistic row and column selection, or data source selection.

In certain aspects, the operations of the operation subsystem 108 can further include operations such as equal to, min, max, not, and the like. Further, the neural network programmer system 100 can be configured to handle natural language entries in an input table. As such, the operation subsystem 108 can also include a string-match operation in which the operation subsystem 108 can manipulate natural language inputs.

The neural network programmer system 100 can be trained using the system outputs that are generated by the neural network programmer system 100. As such, the neural network programmer system 100 can be trained using the generated lookup outputs and scalar outputs. For each of the types of outputs, scalar or lookup, the system 100 may be configured to determine a particular loss function. For example, if the answer is determined by the system 100 to be a scalar, the system 100 can be configured to provide a scalar output. In certain aspects, the loss function corresponding to the scalar output can be generated by the following computations, $$L_{scalar}(\text{scalar\_output}_T, y) = \begin{cases} \frac{1}{2}a^2, & \text{if } a \leq \delta \\ \delta\alpha - \frac{1}{2}\delta^2, & \text{otherwise} \end{cases}$$

In this instance, a represents an absolute difference between a predicted answer and a true answer (a=|scalar_output$_T$−y|). Additionally, δ represents a Huber constant that is treated as a model hyper-parameter in this instance.

In other aspects, if the answer is determined by the neural network system 100 to be a set of items in a table, the answer can be converted to y, where y[i,j] indicates whether the element (i,j) is part of the lookup output. The loss function corresponding to the lookup output can be generated by the following computations, $$L_{lookup}(\text{lookup\_output}_T, y) =$$
$$-\frac{1}{MC}\sum_{i=1}^{M}\sum_{j=1}^{C} (y[i, j]\log(\text{lookup\_output}_T[i, j]) +$$
$$(1 - y[i, j])\log(1 - \text{lookup\_output}_T[i, j]))$$

The loss functions corresponding to the scalar output and the lookup output can be used in training the neural network programmer system 100. For example, the training objective of the neural network programmer system 100 can be generated by the following computations, $$L = \frac{1}{N}\sum_{i=1}^{N} ([n_i == \text{True}]L_{scalar}^i + [n_i == \text{False}]\lambda L_{lookup}^i$$

In this instance, N represents a total number of training examples, $L_{scalar}^i$ and $L_{lookup}^i$ each represent the scalar and lookup loss values for a particular training example L, $n_i$ is a Boolean random variable which is set to True when the i$^{th}$ training example is a scalar and set to False when the i$^{th}$ training example is a lookup, and A represents a hyper-parameters of the system 100 that allows each of the loss functions to be weighted appropriately. Because the components of the system are fully differentiable, the system 100 can train the components of the system 100 to minimize the loss function using a conventional neural network training procedure, e.g., stochastic gradient descent with backpropagation through time.

During runtime, i.e., after the components of the system 100 have been trained to determine trained values of their parameters, the computations of the neural network programmer system 100 may be altered. For example, the "softmax" layers included in the computations may be replaced with a corresponding conventional maximum operation, such as a "hardmax" layer.

Figure 2:
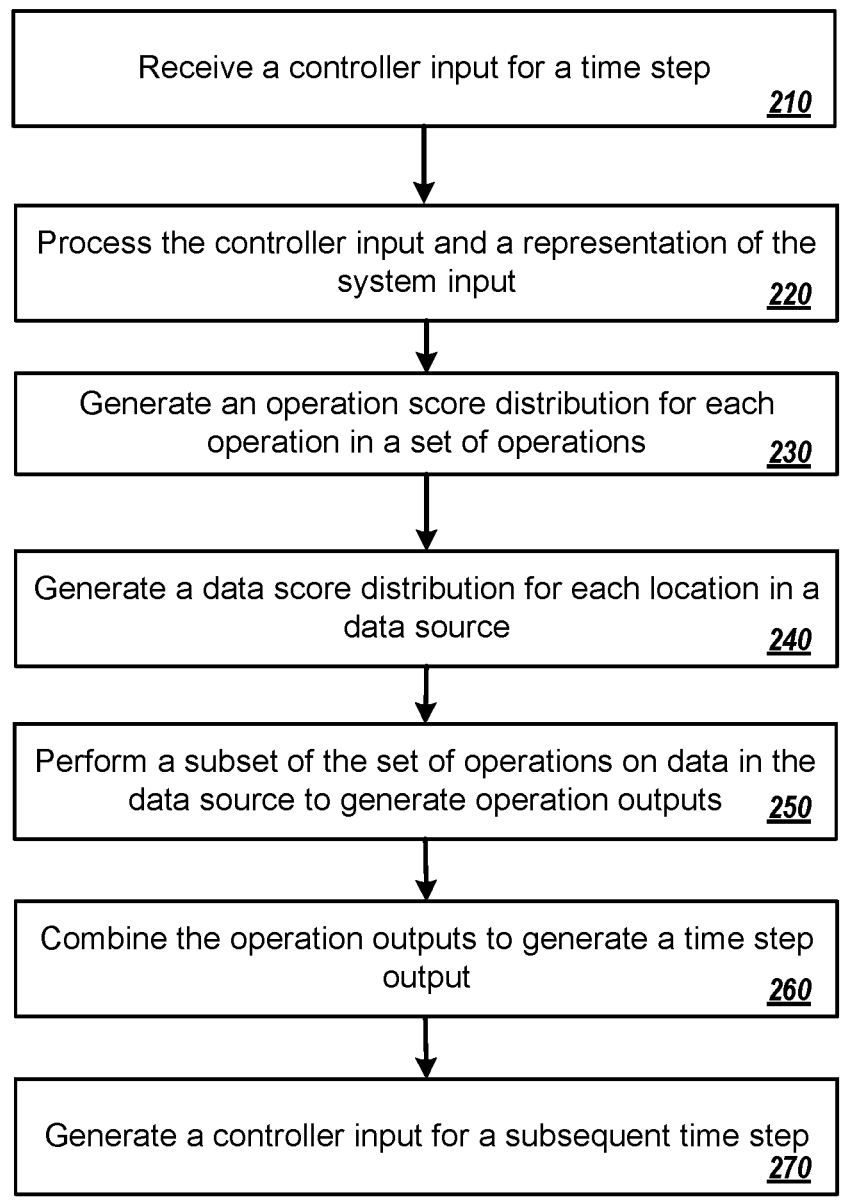
FIG. 2 is a flow diagram of an example process for generating a subsequent controller input from an initial controller input.

FIG. 2 is a flow diagram of an example process 200 for generating a time step output from a controller input. For convenience, the process 200 will be described as being performed by a system of one or more computers located in one or more locations. For example, a neural network programmer system, e.g., the neural network programmer system 100 of FIG. 1, appropriately programmed in accordance with this specification can perform the process 200.

At step 210, the system receives a controller input for a time step. The controller input can be generated by concatenating weighted representations of operations and values of the columns with their corresponding probability distribution produced for a previous time step. The controller input can also include a representation of the system input. Thus, the controller input can include an input based on a previous neural network output and the representation of the system input. In certain aspects, the neural network programming system includes an encoding recurrent neural network configured to process a system input to generate the representation of the input. For example, the system input can include a natural language question. In this instance, each word in the natural language question can correspond to a generated representation. As such, the encoding neural network can provide the representation of the system input to the system as controller input.

At step 220, the system processes the control input and the representation of the system input. The control input and the representation of the system input can be processed with respect to the computations of the modules described in FIG. 1.

At step 230, the system generates an operation score distribution over a set of operations. The operation score distribution can be generated by the controller. The controller can be configured to determine a particular operation distribution for each operation at the time step. The particular operation distribution for each operation at each time step can be based on a current system input, as well as previous time step outputs that were provided as inputs to the neural network programming system.

At step 240, the system generates a data score distribution over locations in the data source. The data distribution score can be generated by the controller of the system. The controller can be configured to determine a particular data distribution score for each data segment at a particular location in a data source at the time step. Specifically, the data source can include data segments in the form of columns and/or rows. The particular data score distribution for each data segment can be based on a current system input, as well as previous time step outputs of the neural network programming system.

At step 250, the system performs a subset of operations on data in the data source to generate operation outputs. The subset of operations and the data in the data source can be selected by the neural network programming system based on the generated operation score distribution and the generated data score distribution. In certain aspects, the neural network programming system is configured to perform operations from the set of operations on data of the data source to generate a plurality of operation outputs for the time step.

At step 260, the system combines the operations outputs to generate a time step output for the current time step. The time step output can include a lookup output, a scalar output, or both. The scalar output can include a scalar number that is provided as output. The lookup output can include a probability that a particular answer in the data source is part of the time step output. The system can determine whether the time step output includes a scalar output or a lookup output. If the current time step is the last time step, the system can use the lookup output or scalar output as the final system output for the system input. For example, if the predetermined system input is a natural language question that relates to the data segments in the data source, the lookup output or the scalar output can be an estimate of the answer to the question as determined by the system.

At step 270, if the time step is not the last time step, the system generates a controller input for a subsequent time step. The controller input can include a sequence of inputs. In certain aspects, the controller input can include a weighted sum of vectors representing locations in the data source and a weighted sum of vectors representing the operations in the set of operations. For example, if the predetermined system input is a natural language question that relates to the data segments in the data source, the controller input for the subsequent time step can include the combination of operation outputs at the previous time step, or time step output.

Figure 3:
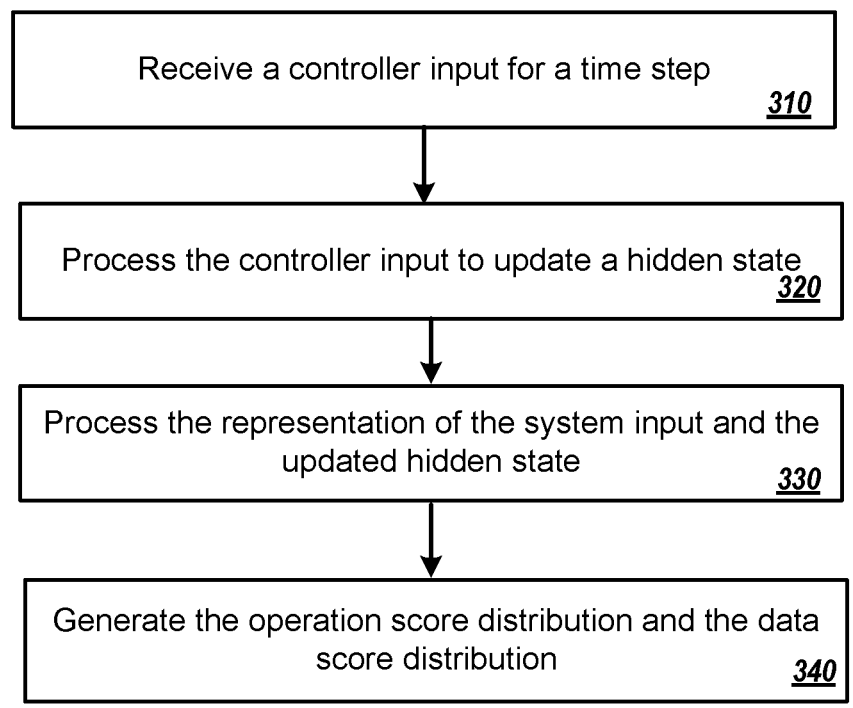
FIG. 3 is a flow diagram of an example process for generating an operation score distribution and a data score distribution from a system input.

FIG. 3 is a flow diagram of an example process 300 for generating an operation score distribution and a data score distribution from a system input. For convenience, the process 300 will be described as being performed by a system of one or more computers located in one or more locations. For example, a neural network programmer system, e.g., the neural network programmer system 100 of FIG. 1, appropriately programmed in accordance with this specification can perform the process 300.

At step 310, the system receives a controller input for a time step. The controller input can be generated by concatenating weighted representations of operations and values of the columns with their corresponding probability distribution produced for a previous time step. The controller input can also include a representation of the system input. Thus, the controller input can include an input based on a previous neural network output and the representation of the system input. In certain aspects, the neural network programming system includes an encoding recurrent neural network configured to process a system input to generate the representation of the input. For example, the system input can include a natural language question. In this instance, each word in the natural language question can correspond to a generated representation. As such, the encoding neural network can provide the representation of the system input to the system as controller input.

At step 320, the system processes the controller input to update a hidden state for the time step. The hidden state for the time step can correspond to previous time step outputs. For example, the data of the controller of the neural network programming system can be used to determine the hidden state for each time step. The controller can be configured to track previous operations and data segments that were selected by the controller.

The data of the controller can be encoded in a hidden vector at the time step. In certain aspects, the hidden vector corresponds to the hidden state of the controller. As such, the received controller input can be used to update a current hidden state of the neural network programming system.

At step 330, the system processes the representation of the system input and the updated hidden state. In processing the representation of the system input and the updated hidden state, the neural network programming system can use the data of the controller to induce probability distributions over operations and data segments.

At step 340, the system generates an operation score distribution and a data score distribution for the time step. The controller can be configured to generate the operation score distribution and the data score distribution based on data corresponding to the subset of operations, the particular data segments, and the updated hidden state of the time step.

Figure 4:
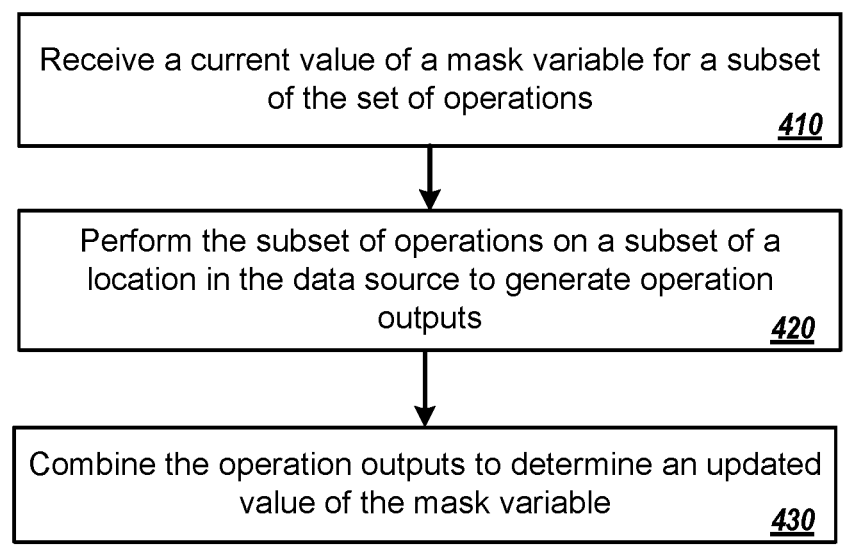
FIG. 4 is a flow diagram of an example process for updating a value of a mask variable.

FIG. 4 is a flow diagram of an example process 400 for updating a value of a mask variable. For convenience, the process 400 will be described as being performed by a system of one or more computers located in one or more locations. For example, a neural network programmer system, e.g., the neural network programmer system 100 of FIG. 1, appropriately programmed in accordance with this specification can perform the process 400.

At step 410, the system receives a current value of a mask variable. The current value of the mask variable can point to a subset of the locations in the data source. The value of the mask variable can be used as a row selector of a particular data source, such as a particular row or column in the particular data source. As such, the mask variable can be used to enable probabilistic row and column selection, or in other words, data source selection.

At step 420, the system performs a subset of operations on a subset of a location in the data source to generate operation outputs. The subset of operations and the location of data in the data source can be selected by the neural network programming system based on the operation score distribution and the data score distribution. As such, the subset of operations and the location of data in the data source are dependent on the current value of the mask value. In certain aspects, the neural network programming system is configured to perform operations from the set of operations on data of the data source to generate a plurality of operation outputs for a time step.

At step 430, the neural network programmer system determines an updated value of the mask variable by combining the operation outputs in accordance with the operation score distribution. For example, the neural network programmer system can be configured to determine an updated mask variable at a particular time step by combining the operation output of each individual operation on certain data segments that are weighted with their corresponding, assigned probabilities.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

What is claimed is:

1. A neural network system for generating a system output from a system input by repeatedly performing operations from a set of operations using data from a data source, wherein the system input is a natural language query and the system output is a response to the natural language query generated based on the data from the data source, the neural network system comprising:
   a controller neural network comprising:
      a recurrent neural network configured to, for each of a plurality of time steps, receive a controller input for the time step and to process the controller input to update a current hidden state of the recurrent neural network,
      one or more operation neural network layers configured to, for each of the plurality of time steps, process the respective updated hidden state of the recurrent neural network and a respective representation of the natural language query in accordance with current parameter values of the one or more operation neural network layers to generate an operation score distribution that assigns a respective operation score to each operation in the set of operations, and
      one or more data neural network layers configured to, for each of the plurality of time steps, process the respective updated hidden state of the recurrent neural network and the respective representation of the natural language query in accordance with current parameter values of the one or more data neural network layers to generate a data score distribution that assigns a respective data score to each of a plurality of locations in the data source; and
   an operation subsystem configured to, for each of the plurality of time steps:
      perform operations from the set of operations to generate a plurality of operation outputs, wherein at least one of the operations is performed on data in the plurality of locations in the data source,
      combine the operation outputs in accordance with the respective operation score distribution and the respective data score distribution to generate a time step output for the time step, and
      generate a next controller input for a next time step from concatenating (i) a weighted sum of vectors representing the operations in the set of operation in accordance with the respective operation score distribution, and (ii) a weighted sum of vectors representing the plurality of locations in the data source in accordance with the respective data score distribution.

2. The neural network system of claim 1, wherein the operation subsystem is further configured to, for each of the plurality of time steps:
   store the time step output for the time step for use in any following time steps.

3. The neural network system of claim 1, wherein the controller input for a first time step in the plurality of time steps is a predetermined initial input.

4. The neural network system of claim 1, wherein the system input is a sequence of inputs, and wherein the neural network system further comprises:
   an encoding recurrent neural network configured to process each input in the sequence of inputs to generate the representation of the input.

5. The neural network system of claim 4, wherein the natural language query relates to the data in the data source, and wherein the system output is an estimate of the response to the natural language query.

6. The neural network system of claim 1, wherein one or more of the operations take as input a value of a mask variable that points to a subset of a location in the data source and wherein the operation subsystem is configured to, for each of the plurality of time steps:
   determine a current value of the mask variable by combining the operation outputs in accordance with the operation score distribution.

7. The system of claim 1, wherein the time step output for the time step includes at least one of a lookup output or a scalar output.

8. A method for generating a system output from a system input by repeatedly performing operations from a set of operations using data from a data source, wherein the system input is a natural language query and the system output is a response to the natural language query generated based on the data from the data source, the method comprising, for each of a plurality of time steps:
processing a controller input for the time step using a controller recurrent neural network to update a current hidden state of the controller recurrent neural network;
processing the updated hidden state of the controller recurrent neural network and a representation of the natural language query using one or more operation neural network layers of the controller recurrent neural network to generate an operation score distribution that assigns a respective operation score to each operation in the set of operations;
processing the updated hidden state of the controller recurrent neural network and the representation of the natural language query using one or more data neural network layers of the controller recurrent neural network to generate a data score distribution that assigns a respective data score to each of a plurality of locations in the data source;
performing operations from the set of operations to generate a plurality of operation outputs, wherein at least one of the operations is performed on data in the plurality of locations in the data source;
combining the operation outputs in accordance with the operation score distribution and the data score distribution to generate a time step output for the time step; and
generating a next controller input for a next time step from concatenating (i) a weighted sum of vectors representing the operations in the set of operation in accordance with the respective operation score distribution, and (ii) a weighted sum of vectors representing the plurality of locations in the data source in accordance with the respective data score distribution.

9. The method of claim 8, further comprising, for each of the plurality of time steps:
storing the time step output for the time step for use in any following time steps.

10. The method of claim 8, wherein the controller input for a first time step in the plurality of time steps is a predetermined initial input.

11. The method of claim 8, wherein the system input is a sequence of inputs, and further comprising:
processing, by an encoding recurrent neural network of a neural network system, each input in the sequence of inputs to generate the representation of the input.

12. The method of claim 11, wherein the system input is a natural language question that relates to the data in the data source, and wherein the system output is an estimate of an answer to the natural language question.

13. The method of claim 8, wherein one or more of the operations take as input a value of a mask variable that points to a subset of a location in the data source and wherein each of the plurality of time steps comprises:
determining a current value of the mask variable by combining the operation outputs in accordance with the operation score distribution.

14. A non-transitory computer storage medium encoded with instructions that, when executed by one or more computers, cause the one or more computers to perform operations for generating a system output from a system input by repeatedly performing operations from a set of operations using data from a data source, wherein the system input is a natural language query and the system output is a response to the natural language query generated based on the data from the data source, and wherein the operations comprise, for each of a plurality of time steps:
processing a controller input for the time step using a controller recurrent neural network to update a current hidden state of the controller recurrent neural network;
processing the updated hidden state of the controller recurrent neural network and a representation of the natural language query using one or more operation neural network layers of the controller recurrent neural network to generate an operation score distribution that assigns a respective operation score to each operation in the set of operations;
processing the updated hidden state of the controller recurrent neural network and the representation of the natural language query using one or more data neural network layers of the controller recurrent neural network to generate a data score distribution that assigns a respective data score to each of a plurality of locations in the data source;
performing operations from the set of operations to generate a plurality of operation outputs, wherein at least one of the operations is performed on data in the plurality of locations in the data source;
combining the operation outputs in accordance with the operation score distribution and the data score distribution to generate a time step output for the time step, and
generating a next controller input for a next time step from concatenating (i) a weighted sum of vectors representing the operations in the set of operation in accordance with the respective operation score distribution, and (ii) a weighted sum of vectors representing the plurality of locations in the data source in accordance with the respective data score distribution.

15. The non-transitory computer storage medium of claim 14, the operations further comprising, for each of the plurality of time steps:
storing the time step output for the time step for use in any following time steps.

* * * * *

UNITED STATES PATENT AND TRADEMARK OFFICE
CERTIFICATE OF CORRECTION

| | | |
|---|---|---|
| PATENT NO. | : 10,963,779 B2 | Page 1 of 1 |
| APPLICATION NO. | : 15/349955 | |
| DATED | : March 30, 2021 | |
| INVENTOR(S) | : Le et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 728 days.

Signed and Sealed this
Twenty-fifth Day of October, 2022

*Katherine Kelly Vidal*

Katherine Kelly Vidal
*Director of the United States Patent and Trademark Office*